US008619731B2

(12) United States Patent
Montemurro et al.

(10) Patent No.: US 8,619,731 B2
(45) Date of Patent: Dec. 31, 2013

(54) FRAGMENTING LARGE PACKETS IN THE PRESENCE OF HIGH PRIORITY PACKETS

(75) Inventors: Michael Montemurro, Toronto (CA); Roger Durand, Amherst, NH (US)

(73) Assignee: BlackBerry Limited, Waterloo (CA)

( * ) Notice: Subject to any disclaimer, the term of this patent is extended or adjusted under 35 U.S.C. 154(b) by 993 days.

(21) Appl. No.: 12/013,682

(22) Filed: Jan. 14, 2008

(65) Prior Publication Data

US 2008/0170553 A1 Jul. 17, 2008

Related U.S. Application Data

(60) Provisional application No. 60/884,923, filed on Jan. 15, 2007.

(51) Int. Cl.
*H04W 4/00* (2009.01)
(52) U.S. Cl.
USPC ............................................ 370/338; 709/236
(58) Field of Classification Search
USPC .................................. 370/338, 326; 709/236
See application file for complete search history.

(56) References Cited

U.S. PATENT DOCUMENTS

| | | | | | |
|---|---|---|---|---|---|
| 5,889,772 | A | * | 3/1999 | Fischer et al. | 370/346 |
| 6,721,568 | B1 | * | 4/2004 | Gustavsson et al. | 455/450 |
| 7,231,445 | B1 | * | 6/2007 | Aweya et al. | 709/226 |
| 7,436,454 | B2 | * | 10/2008 | Yamaguchi et al. | 348/387.1 |
| 7,437,290 | B2 | * | 10/2008 | Danieli | 704/251 |
| 7,545,830 | B1 | * | 6/2009 | Culp | 370/474 |
| 7,631,096 | B1 | * | 12/2009 | Yeh et al. | 709/235 |
| 7,664,089 | B2 | * | 2/2010 | Zhao | 370/338 |
| 7,684,430 | B2 | * | 3/2010 | Gaur et al. | 370/447 |
| 7,734,253 | B2 | * | 6/2010 | Chen et al. | 455/41.2 |
| 7,843,820 | B2 | * | 11/2010 | Lai et al. | 370/230 |
| 7,986,652 | B1 | * | 7/2011 | Hui et al. | 370/311 |
| 8,184,603 | B2 | * | 5/2012 | Waylett et al. | 370/338 |
| 2001/0030978 | A1 | * | 10/2001 | Holloway et al. | 370/503 |
| 2003/0058795 | A1 | * | 3/2003 | Lansing et al. | 370/235 |
| 2003/0095560 | A1 | * | 5/2003 | Arita et al. | 370/431 |
| 2003/0110286 | A1 | * | 6/2003 | Antal et al. | 709/236 |
| 2004/0184475 | A1 | * | 9/2004 | Meier | 370/449 |
| 2004/0264488 | A1 | | 12/2004 | Yoon et al. | |
| 2006/0084383 | A1 | * | 4/2006 | Ibrahim et al. | 455/41.2 |
| 2006/0099928 | A1 | * | 5/2006 | Conte et al. | 455/404.2 |
| 2006/0099948 | A1 | * | 5/2006 | Hoghooghi et al. | 455/436 |

(Continued)

FOREIGN PATENT DOCUMENTS

WO 2005/020522 A1 3/2005

OTHER PUBLICATIONS

Ginese, Salvatore, Written Opinion of the International Searching Authority for PCT/CA2008/000067, Apr. 30, 2008.

(Continued)

*Primary Examiner* — Bunjob Jaroenchonwanit
(74) *Attorney, Agent, or Firm* — Novak Druce Connolly Bove + Quigg LLP

(57) ABSTRACT

In the presence of high priority traffic received at a mobile station over a wireless medium or to be transmitted by the mobile station over the wireless medium, a fragmentation threshold in a wireless local area network (WLAN) medium access control (MAC) layer of the mobile station is adjusted according to a highest priority of the traffic. Packets received by the WLAN MAC layer are fragmented into packets each of which is no larger than the fragmentation threshold.

12 Claims, 5 Drawing Sheets

(56) References Cited

U.S. PATENT DOCUMENTS

| | | | |
|---|---|---|---|
| 2006/0133272 A1* | 6/2006 | Yuan et al. | 370/230 |
| 2006/0215626 A1* | 9/2006 | Ross | 370/344 |
| 2006/0268716 A1* | 11/2006 | Wijting et al. | 370/235 |
| 2007/0008937 A1* | 1/2007 | Mody et al. | 370/338 |
| 2007/0147285 A1* | 6/2007 | Jin et al. | 370/329 |
| 2007/0225044 A1* | 9/2007 | Law et al. | 455/562.1 |
| 2008/0056297 A1* | 3/2008 | Gaur et al. | 370/447 |
| 2008/0130603 A1* | 6/2008 | Wentink et al. | 370/338 |
| 2008/0159140 A1* | 7/2008 | Robinson et al. | 370/232 |
| 2008/0181248 A1* | 7/2008 | Haran et al. | 370/412 |
| 2009/0213874 A1* | 8/2009 | Levit | 370/468 |
| 2012/0034870 A9* | 2/2012 | Desai et al. | 455/41.2 |

OTHER PUBLICATIONS

Wolf, William, Extended European Search Report for EP 08706215.4, Mar. 25, 2010.

Office Action mailed Jan. 24, 2012; in corresponding Canadian Patent Application No. 2,673,208.

Examination report mailed Jun. 11, 2012, in European patent application No. 08706215.4.

Examination report mailed Jul. 3, 2013, in corresponding European patent application No. 08706215.4.

Extended European Search report mailed Jun. 28, 2013, in corresponding European patent application No. 12174159.9.

Office Action mailed Jan. 21, 2013, in corresponding Canadian patent application No. 2,673,208.

* cited by examiner

FRAGMENTING LARGE PACKETS IN THE PRESENCE OF HIGH PRIORITY PACKETS

CROSS-REFERENCE TO RELATED APPLICATIONS

This application claims priority under 35 USC 119(e) from U.S. Provisional Patent Application No. 60/884,923, filed Jan. 15, 2007, and which is incorporated by reference herein.

BACKGROUND

IEEE 802.11 Enhanced Distributed Channel Access (EDCA) is a method of medium access defined in IEEE 802.11e and is an enhancement to the original IEEE 802.11 Media Access Control (MAC) sublayer. EDCA provides four prioritized queues for data transmission. The queues use a contention-based mechanism to determine the next packet for transmission. The queue parameters are set such that the high priority queues have a preference for access to the wireless medium.

When the size of the MAC protocol data units (MPDUs) being transmitted for each class of traffic are approximately the same, the contention mechanism works well. However, when the MPDUs are of different sizes, the larger MPDU transmissions end up taking more medium time. For a device that is transmitting small voice MPDUs and large best effort MPDUs, the best effort traffic will introduce delays in the transmission of the voice traffic.

BRIEF DESCRIPTION OF THE DRAWINGS

Embodiments are illustrated by way of example and not limitation in the figures of the accompanying drawings, in which like reference numerals indicate corresponding, analogous or similar elements, and in which:

FIGS. 5-1 and 5-2 are exemplary timing diagrams that illustrate high priority traffic and low priority traffic sharing a wireless medium.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

A mobile station controls transmission of traffic over a wireless medium by dynamically adjusting a fragmentation threshold in a wireless local area network (WLAN) medium access control (MAC) layer of the mobile station according to the presence or absence of high priority traffic. In the absence of high priority traffic received at the mobile station over the wireless medium or to be transmitted by the mobile station over the wireless medium, the fragmentation threshold is set to a first value. In the presence of high priority traffic, the fragmentation threshold is set to a value that is smaller than the first value.

The first value may be a large fragmentation threshold to promote efficient transmission of low priority traffic. The second value may be larger than any expected size of MAC service data unit (MSDU) for high priority traffic, so as not to fragment high priority traffic. The second value may be slightly larger than the largest expected size of MSDU for high priority traffic.

A stream control application in the mobile station may be monitored to determine whether the high priority traffic is present. The stream control application may also be monitored to determine an expected size of MSDUs for the high priority traffic.

Although this description states "first value" and "second value", these are only labels and it is contemplated that there will be more than one "second value". The "second value" may depend on what is considered to be high priority traffic and what is considered to be low priority traffic. For example, if the high priority traffic is voice traffic, the low priority traffic may be considered to comprise video traffic, best effort traffic and background traffic. Since voice MSDUs are typically around 108 bytes in size, the "second value" may be set to 256 bytes, for example. If the high priority traffic is real-time video traffic, the low priority traffic may be considered to comprise best effort traffic and background traffic. Since video MSDUs are typically around 500 bytes in size, the "second value" may be set to somewhere in the range of 600 to 800 bytes, for example.

Figure 1:
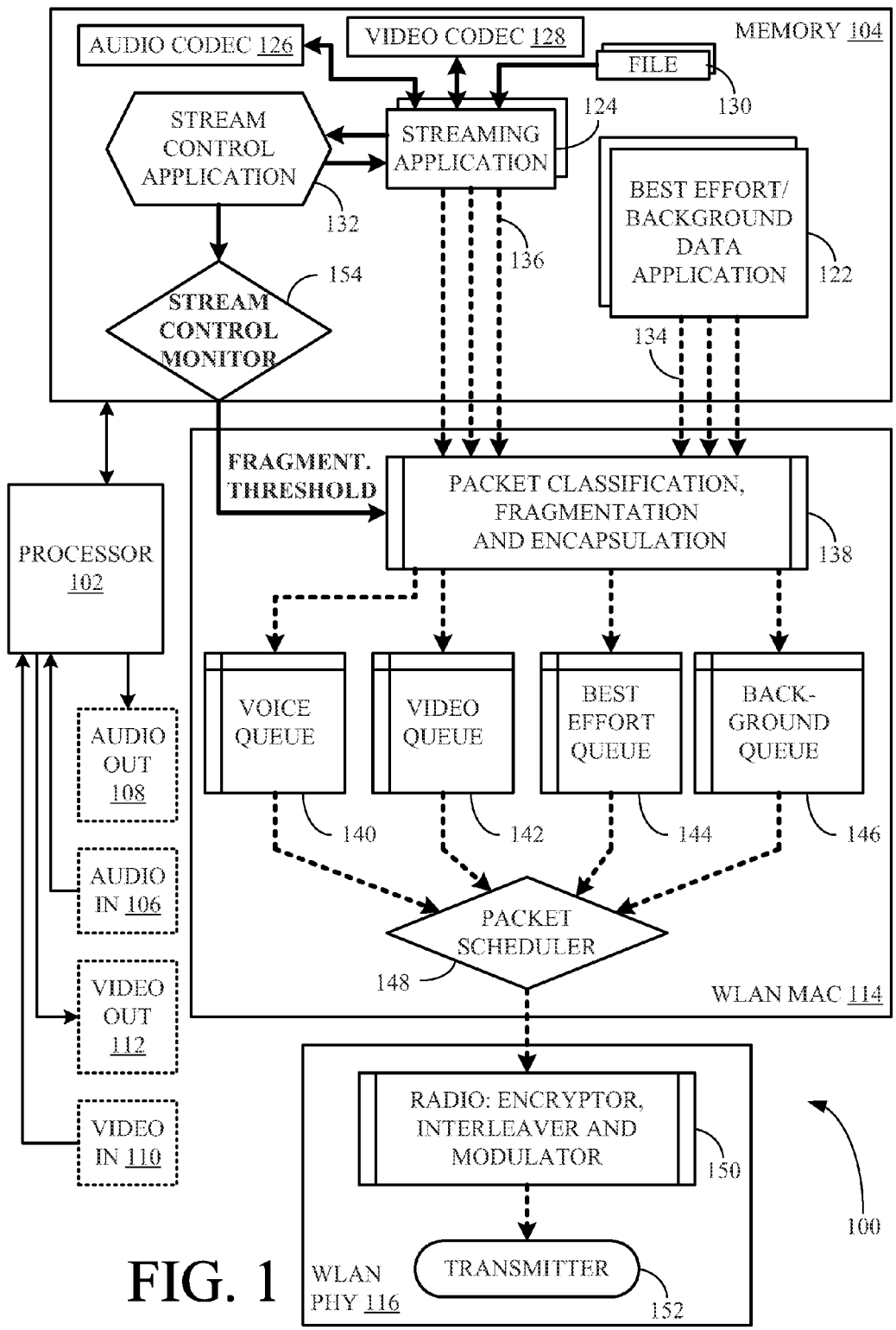
FIG. 1 illustrates an exemplary mobile station.

FIG. 1 illustrates an exemplary mobile station 100. Mobile station 100 is compatible with one or more WLAN standards, for example, IEEE 802.11 standards, ETSI HiperLAN standards, or future related standards.

A non-exhaustive list of examples for mobile station 100 includes a wireless-enabled laptop computer, a wireless-enabled tablet computer, a wireless-enabled cellphone, a wireless-enabled personal digital assistant (PDA), a wireless-enabled smart phone, a wireless-enabled video camera/monitor, a wireless-enabled gaming/multimedia console, a wireless-enabled sensor/reporting/storage device, a wireless Internet Protocol (IP) phone and any other suitable WLAN client device.

Mobile station 100 comprises a processor 102 and a memory 104 coupled to processor 102. A non-exhaustive list of examples for processor 102 includes a central processing unit (CPU), a digital signal processor (DSP), a reduced instruction set computer (RISC), a complex instruction set computer (CISC) and the like. Furthermore, processor 102 may be part of an application specific integrated circuit (ASIC) or may be a part of an application specific standard product (ASSP).

A non-exhaustive list of examples for memory 104 includes any combination of the following:

a) semiconductor devices such as registers, latches, read only memory (ROM), mask ROM, electrically erasable programmable read only memory devices (EEPROM), flash memory devices, non-volatile random access memory devices (NVRAM), synchronous dynamic random access memory (SDRAM) devices, RAMBUS dynamic random access memory (RDRAM) devices, double data rate (DDR) memory devices, static random access memory (SRAM), universal serial bus (USB) removable memory, and the like;

b) optical devices, such as compact disk read only memory (CD ROM), and the like; and
c) magnetic devices, such as a hard disk, a floppy disk, a magnetic tape, and the like.

Mobile station 100 may comprise an audio input element 106, for example a microphone, and an audio output element 108, for example, a speaker, coupled to processor 102. Mobile station 100 may comprise a video input element 110, for example, a video camera, and a video output element 112, for example an analog or a digital screen, coupled to processor 102. Alternatively, mobile station 100 may be connectable to external audio input elements, external audio output elements, external video input elements and external video output elements.

Mobile station 100 comprises a WLAN MAC layer module 114 and a WLAN physical layer (PHY) module 116. For example, MAC module 114 may be compatible with IEEE 802.11 and PHY module 116 may be compatible with IEEE 802.2.

The functional architecture of mobile station 100 as shown in FIG. 1 is merely an example, and embodiments of the invention are applicable to communication devices having any other functional architecture. Mobile station 100 includes other components that, for clarity, are not shown in FIG. 1.

One or more applications 122 generate best effort data and/or background data. A non-exhaustive list of examples of applications 122 includes web browsers, email clients and file transfer protocol (FTP) clients. Best effort traffic includes email synchronization, file downloads and web browsing.

One or more streaming applications 124 generate or receive streaming data, including voice and video. A non-exhaustive list of examples of applications 124 includes Internet Protocol television (IPTV), telephone calls using Real-Time Transport Protocol (RTP), video conferencing, and the like. For example, streaming applications 124 may control an audio coder-decoder (codec) 126 to generate a compressed audio stream from audio received from audio input element 106, or may control a video codec 128 to generate a compressed video stream from video received from video input element 110. Memory 104 may store one or more compressed video and/or audio files 130 accessible by streaming applications 124 as input.

A non-exhaustive list of examples for audio codec 126 includes G711, G722, G723, G.726, G.728, G.729, MP3, Windows® Media Audio (WMA), Vector Sum Excited Linear Prediction (VSELP), Digital Speech Standard (DSS), and any other suitable audio codec.

A non-exhaustive list of examples for video codec 128 includes H.261, H.263, H.264, flavors of Moving Picture Experts Group (MPEG), RealVideo®, Windows® Media Video, DivX®, Pixlet®, and any other suitable video codec.

A stream control application 132 is coupled to streaming applications 124 to handle stream set up, call control, codec negotiation and the like. For example, stream control application 132 may implement Session Initiation Protocol (SIP) and/or Session Announcement Protocol (SAP) and/or Real Time Streaming Protocol (RTSP).

Packets 134 and 136 generated by applications 122 and 124, respectively, are provided to WLAN MAC module 114. The applications set the priorities of the packets. For example, the packets may include user priority (UP) bits of IEEE 802.1d, which allow for eight different user priority levels.

A component 138 in WLAN MAC module 114 may classify the packets, fragment any packets that are larger than a fragmentation threshold into fragments, and encapsulate the fragments with a header and/or footer. An encapsulated fragment is also known as a packet. If a packet is fragmented, then the header of the encapsulated fragment includes information as to the order of the fragments to allow for reassembly at the receiver. For example, component 138 may classify the packets using four IEEE 802.11e access categories (AC) that are derived from the IEEE 802.1d user priorities, as follows:

| User Priority | Access Category | |
|---|---|---|
| 001 | AC_BK | Background |
| 010 | AC_BK | Background |
| 000 | AC_BE | Best Effort |
| 011 | AC_BE | Best Effort |
| 100 | AC_VI | Video |
| 101 | AC_VI | Video |
| 110 | AC_VO | Voice |
| 111 | AC_VO | Voice |

Based on their classification, the packets are directed to one of several memory queues partitioned based on priority. For example, memory four queues are shown in FIG. 1: a voice queue 140 for packets classified with AC_VO, a video queue 142 for packets classified with AC_VI, a best effort queue 144 for packets classified with AC_BE, and a background queue 146 for packets classified with AC_BK.

A packet scheduler 148 schedules packets from the memory queues to be passed to WLAN PHY module 116. For example, IEEE 802.11e has separate minimum and maximum values for each access category. Within each access category, a random number is generated that represents a wait time as multiplied by a "slot time". In IEEE 802.11a/g, a slot time is 9 microseconds. Once the wireless medium is quiet or unoccupied, a countdown begins before transmission. Each count is 9 microseconds in real time. For voice queue 140, the countdown begins at a value between 31 and 127. For video queue 142, the countdown begins at a value between 127 and 255. For best effort queue 144, the countdown begins at a value between 255 and 511. For background queue 146, the countdown begins at a value between 511 and 1023. If the countdown is interrupted, it is paused until the wireless medium is once again quiet, and is then resumed from the value at which it was paused. If the countdowns for different queues begin at the same time, traffic in a higher priority queue will gain access to the wireless medium ahead of traffic in a lower priority queue.

WLAN PHY module 116 comprises a radio 150 and a transmitter 152. Radio 150 encrypts, interleaves and modulates the packets received from packet scheduler 148. Transmitter 152 is a radio frequency (RF) chain that represents everything after the digital-to-analog converter to the antenna. This chain comprises, for example, an analog-to-digital converter, a filter, a mixer/frequency converter, a bandpass filter, a transmit/receive switch, a power amplifier, additional filters, antenna matching circuits, an antenna switch and an antenna.

A stream control monitor 154 is coupled to stream control application 132 and to WLAN MAC module 114.

Figure 2:
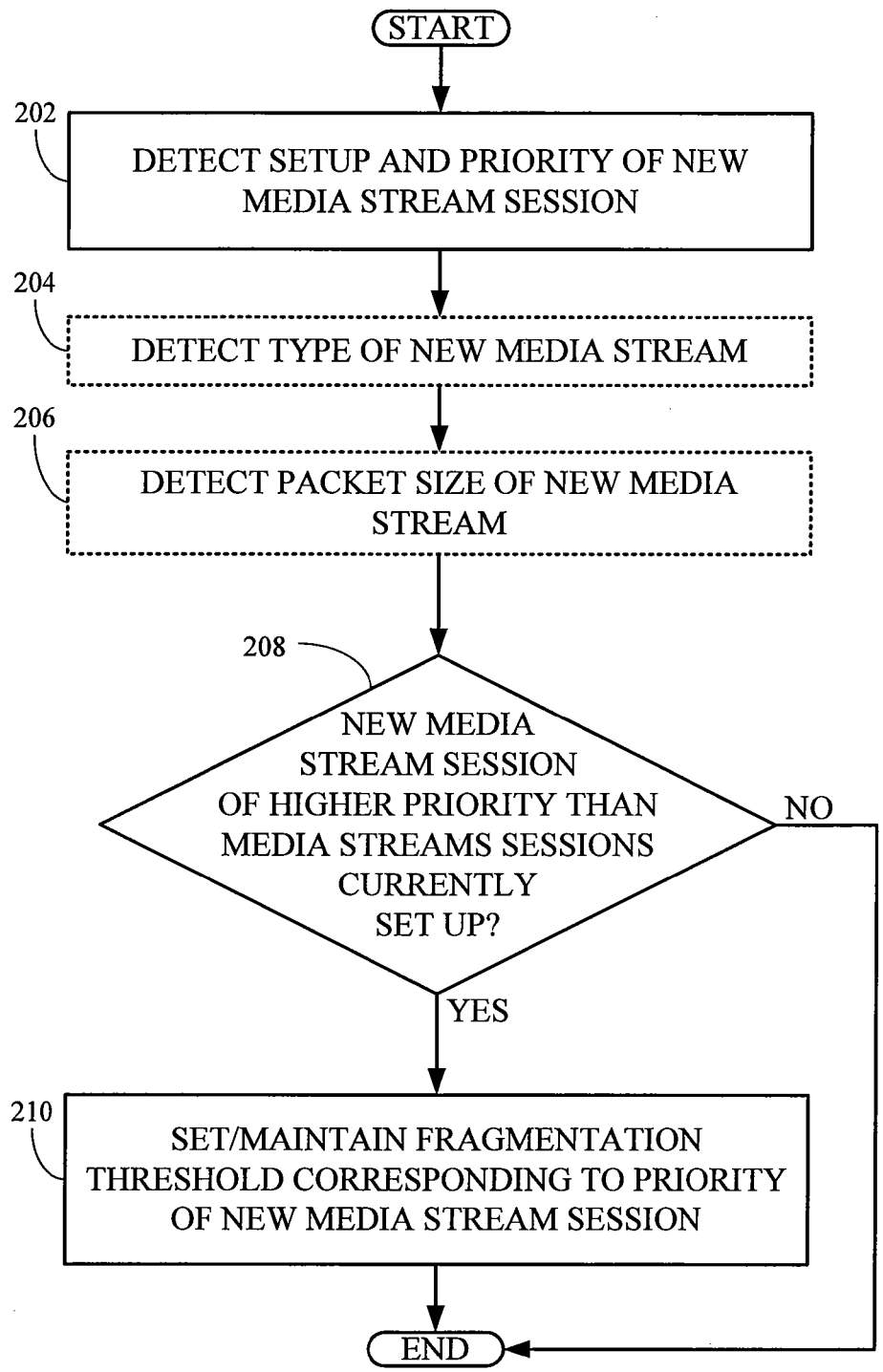
FIGS. 2 and 3 are flowcharts of an exemplary method for controlling transmission of traffic from a mobile station over a wireless medium.
Figure 3:
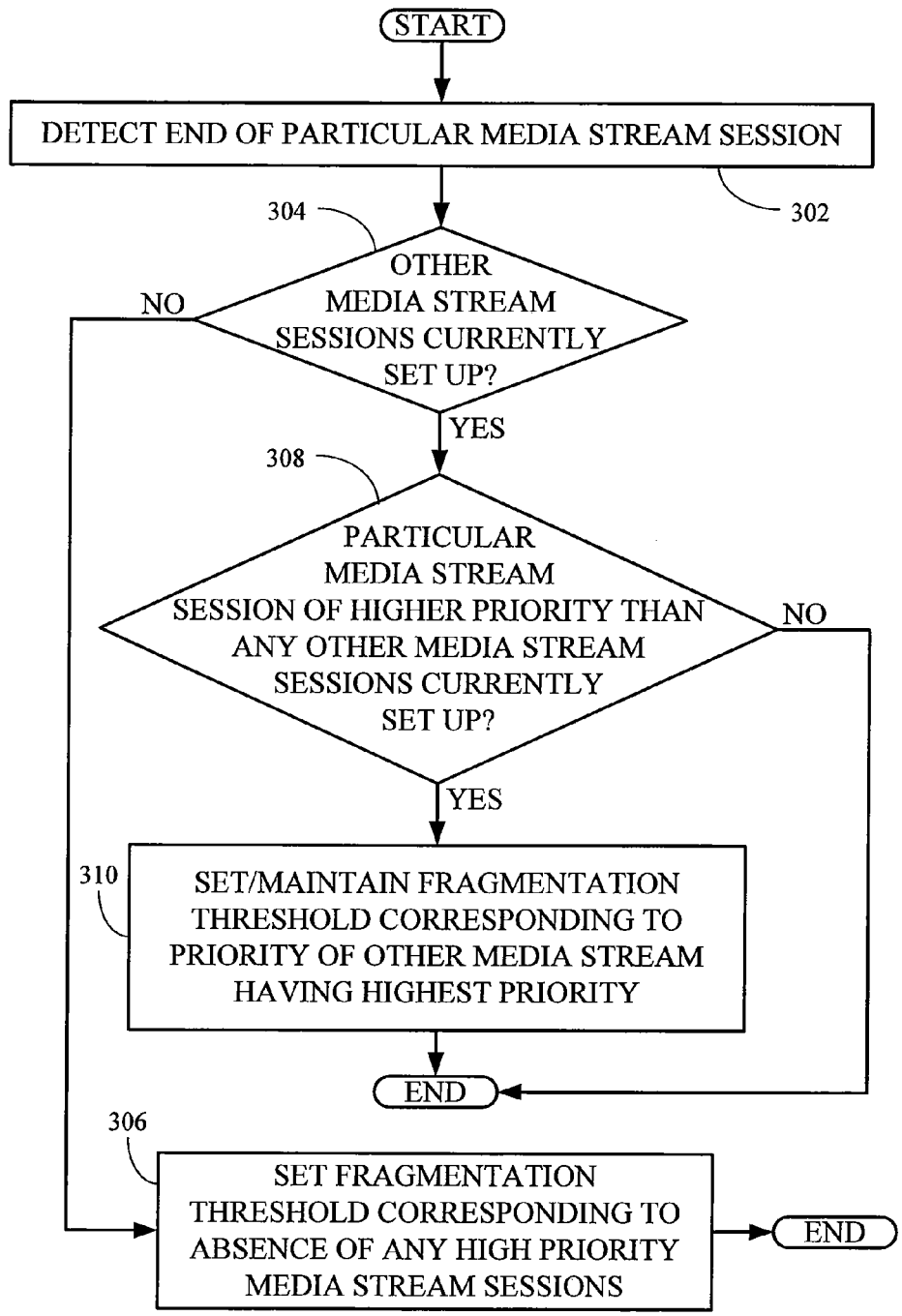

Reference is made additionally to FIGS. 2 and 3, which are flowcharts of an exemplary method for controlling transmission of traffic from a mobile station over a wireless medium. The methods of FIGS. 2 and 3 may be implemented in stream control monitor 154, which monitors stream control application 132.

The method of FIG. 2 is invoked when stream control monitor 154 detects the setup of a new media stream session, for example, a new audio stream session or a new video stream session, at 202. For example, there is an admission control protocol defined for IEEE 802.11e, which allows the mobile station's control monitor to detect high priority traffic flows. At the start of a flow, the mobile station will send an admission control request to the access point to request a high priority traffic flow. In another example, stream control monitor 154 could snoop the stream or call signaling messages. In yet another example, stream control monitor 154 could act as a proxy for call control.

Stream control monitor 154 detects the priority of the new media stream session. The classification may be done, for example, based on IEEE 802.1d user priorities in layer 2, IP Type of Service (ToS) information at layer 3, or IP Differentiated Services Code Point (DSCP) information at layer 3. The IP address and IP port number in the packet headers may also be used to detect the priority of the new media stream session.

At 204, stream control monitor 154 may detect the type of the new media stream. The type may be inferred from the priority. For example, the highest priority may correspond to audio streams. However, different streams of the same priority may be of different types. For example, video streams of MPEG type A, MPEG type B, MPEG4 broadcast, and MPEG7 conferencing may all have the same priority.

At 206, stream control monitor 154 may detect the packet size (or maximum packet size) of the new media stream. This detection may occur along with the detection of the setup of the media stream session. For example, according to IEEE 802.11e, the packet size of a high priority traffic flow is transmitted as part of the admission control request from the mobile station to the access point in what is known as a traffic specification (TSPEC). In another example, snooping the stream or call control messages may yield the packet size (or maximum packet size).

At 208, stream control monitor 154 checks whether the new media stream session is of higher priority than any other media stream sessions currently set up in the mobile station. If not, then the method ends. If the new media stream session is of higher priority than any other media stream sessions currently set up in the mobile station, then at 210, stream control monitor 154 provides a fragmentation threshold corresponding to the priority of the new media stream session to component 138 of WLAN MAC module 114. Component 138 then fragments packets received by WLAN MAC module 114 into packets no larger than the fragmentation size it has been provided by stream control monitor 154.

A lower bound on the fragmentation threshold provided by stream control monitor 154 to component 138 is that the fragmentation threshold equals or is larger than the expected size of any packet of the new media stream. If the fragmentation threshold is smaller than the expected size of packets of the new media stream, then the packets of the new media stream will be fragmented by component 138, which is undesirable. Therefore, the fragmentation threshold may be set to slightly larger than the largest expected packet size for the new media stream, for example, 10 bytes or 20 bytes larger.

An upper bound on the fragmentation threshold provided by stream control monitor 154 to component 138 is that the fragmentation threshold is sufficiently small to reduce latency caused to traffic of the priority of the new media stream session by lower priority traffic. If the fragmentation threshold is too large, large packets of lower priority traffic may occupy the wireless medium for a duration that adversely affects the transmission of traffic of the priority of the new media stream session.

In one implementation, fragmentation thresholds corresponding to different types of media streams may be defined. At 210, stream control monitor 154 may provide the fragmentation threshold corresponding to the type of the new media stream to component 138 of WLAN MAC module 114. For example, since voice packets are typically around 108 bytes in size, the fragmentation threshold corresponding to voice media streams may be defined as 256 bytes. In another example, since MPEG type A and MPEG4 broadcast packets are typically around 647 bytes in size, the fragmentation threshold corresponding to video media streams of those types may be defined as 754 bytes. In yet another example, since MPEG type B and MPEG7 conferencing packets are typically around 245 bytes or 446 bytes in size, the fragmentation threshold corresponding to video media streams of those types may be defined as 512 bytes.

In another example, fragmentation thresholds corresponding to different priorities may be defined, ignoring the possibility that streams of the same priority may be of different types. At 210, stream control monitor 154 may provide the fragmentation threshold corresponding to the priority of the new media stream to component 138 of WLAN MAC module 114. For example, the fragmentation threshold for packets having IEEE 802.1d user priorities 111 and 110 may be defined as 256 bytes, and the fragmentation threshold for packets having IEEE 802.1d user priorities 101 and 100 may be defined as 754 bytes.

The method of FIG. 3 is invoked when stream control monitor 154 detects the end of a particular media stream session, at 302. For example, if the TSPEC expires without a renewal or is explicitly terminated by the access point, this is an indication that the media stream session has ended. In another example, if the ToS bit in the header of the IP packet for that priority is absent for a certain time out period, for example, 3 seconds, this is also an indication that the media stream session has ended. At 304, stream control monitor 154 checks whether other media stream sessions are currently set up. If not, then at 306, stream control monitor 154 provides a fragmentation threshold corresponding to the absence of high priority traffic to component 138. Since fragmentation introduces overhead, about 48 bytes of overhead in IEEE 802.11e systems, it decreases the perceivable throughput. Therefore, the fragmentation threshold corresponding to the absence of high priority traffic may be a value that promotes efficient transmission, such as a value that is very large in comparison to the packet size of high priority traffic. For example, the value may be larger than 1500 bytes, or larger than 2048 bytes, or even as large as 7000 bytes, as proposed for IEEE 802.11n HD RIFS traffic.

If other media stream sessions are currently set up, then stream control monitor 154 checks at 308 whether the particular media stream session which has just ended was of higher priority than any other media stream sessions currently set up. If not, then the method ends. Otherwise, at 310, stream control monitor 154 provides to component 138 a fragmentation threshold corresponding to the priority of the other media stream session that has the highest priority.

Consider the following scenario:
1. A video stream session of MPEG7 conferencing packets is set up, so the fragmentation threshold is set to 512 bytes, for example. Packets of lower priority traffic which are larger than 512 bytes are fragmented into packets that are no larger than 512 bytes.
2. While the MPEG7 video stream session is still set up, a voice stream session is set up for a telephone call. The fragmentation threshold is therefore set to 256 bytes, for example. Packets of lower priority traffic which are larger than 256 bytes—including the packets of the MPEG7 video stream—are fragmented into packets that are no larger than 256 bytes.

3. While the telephone call is in progress, the MPEG7 video stream session ends. No change is made to the fragmentation threshold, because the telephone call is still the media stream session of highest priority.
4. While the telephone call is still in progress, a video stream session of MPEG4 broadcast packets is set up. No change is made to the fragmentation threshold, because the telephone call is still the media stream session of highest priority.
5. The telephone call ends. Since the MPEG4 video stream session is still set up, the fragmentation threshold is set to 754 bytes, for example.
6. The MPEG4 video stream session ends, and the fragmentation threshold is set to 2048 bytes, for example.

Figure 4:
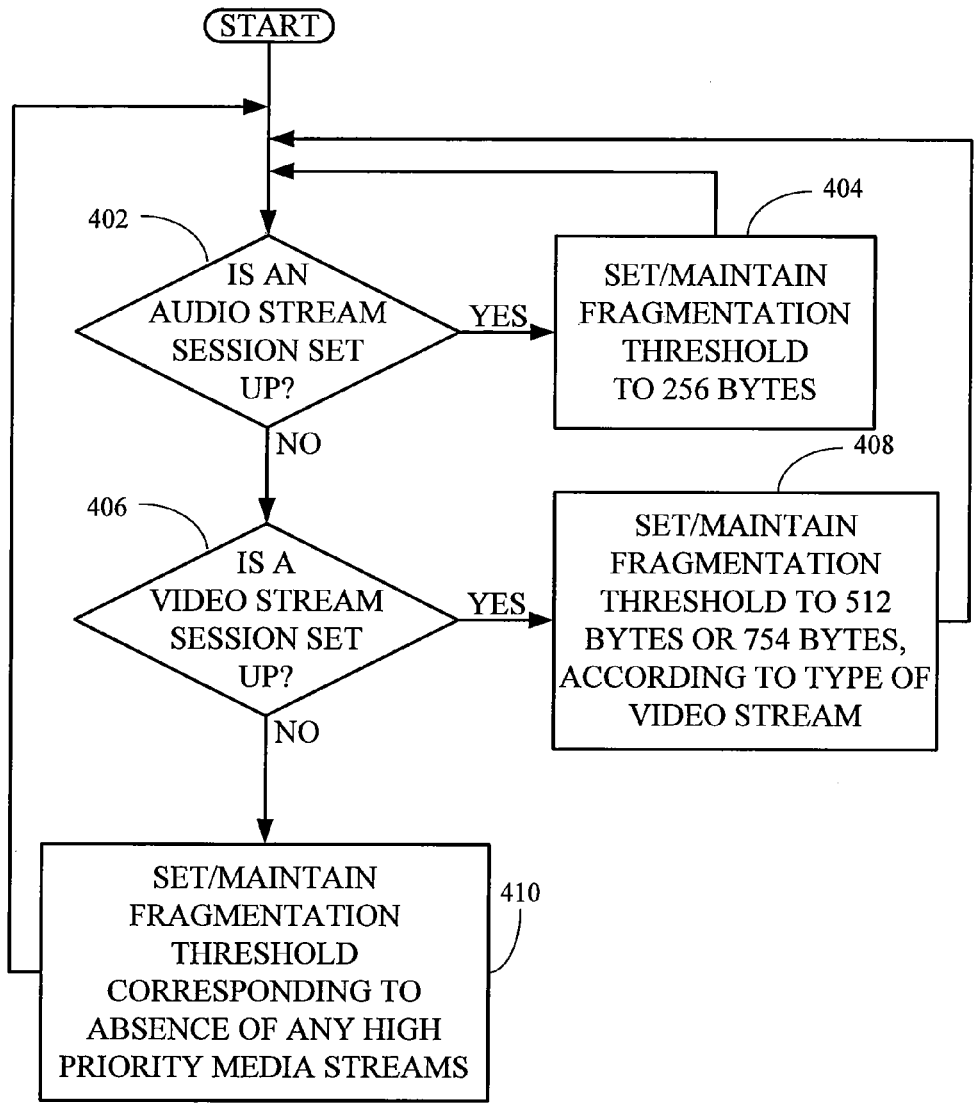
FIG. 4 is a flowchart of another exemplary method for controlling transmission of traffic from a mobile station over a wireless medium.

FIG. 4 is a flowchart of another exemplary method for controlling transmission of traffic from a mobile station over a wireless medium, corresponding to the fragmentation thresholds described in the previous scenario. It is obvious to a person of ordinary skill in the art how to modify the method of FIG. 4 to correspond to other scenarios.

Stream control monitor 154 continually monitors stream control application 132. If an audio stream session is set up, as checked at 402, then the fragmentation threshold is set (or maintained) at 256 bytes, as indicated at 404. If no audio stream session is set up, but a video stream session is set up, as checked at 406, then the fragmentation threshold is set (or maintained) at 512 bytes or 754 bytes, as indicated at 408, depending on the type of the video stream. If neither an audio stream session nor a video stream session is set up, then at 410, the fragmentation threshold is set (or maintained) at a value corresponding to the absence of any high priority traffic.

Figures 1, 5:
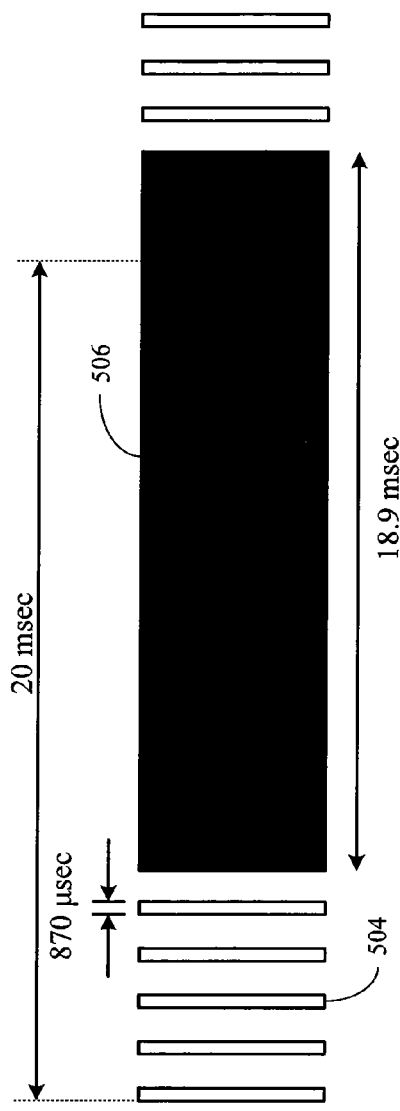
Figures 2, 5:
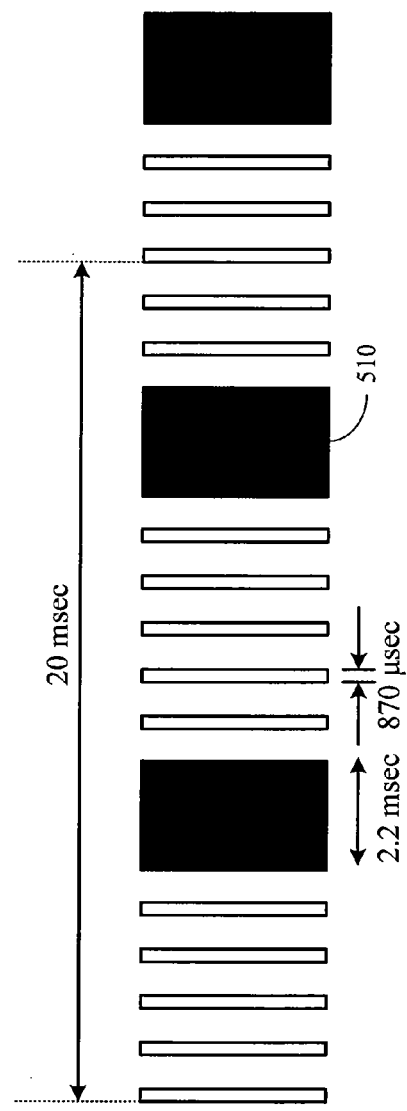

Reference is now made to FIGS. 5A and 5B, which are exemplary timing diagrams that illustrate high priority traffic and low priority traffic sharing a wireless medium. In FIG. 5A, the mobile stations do not implement dynamic fragmentation sizes, whereas in FIG. 5B, the mobile stations do implement dynamic fragmentation sizes. The examples shown in FIGS. 5A and 5B are for IEEE 802.11b/g communications.

High priority voice traffic produces packets 504 of 108 bytes. Each such packet, when transmitted at a data rate of 1 Mbps, occupies the wireless medium for approximately 870 microseconds. A typical voice application may generate packets to be transmitted at an interval of 20 milliseconds. Low priority traffic may produce, for example, a packet 506 of 1546 bytes which, when transmitted at a data rate of 1 Mbps, occupies the wireless medium for approximately 18.9 milliseconds. Since a mobile station may wait 0.2 milliseconds once the wireless medium is quiet or unoccupied before transmitting, the low priority traffic causes a delay of up to 19.1 milliseconds in the transmission of the voice traffic. The voice traffic must wait until packet 506 has been transmitted before gaining access to the medium. This may significantly affect the quality of service for the voice traffic.

If, however, the packet of low priority traffic is fragmented into packets 510 of no more than 256 bytes, then each such packet 510, when transmitted at a data rate of 1 Mbps, will occupy the wireless medium for approximately 2.2 milliseconds. Since a mobile station may wait 0.2 milliseconds once the wireless medium is quiet or unoccupied before transmitting, the low priority traffic causes a delay of up to 2.4 milliseconds in the transmission of the voice traffic. High priority voice traffic is transmitted in between fragments of the low priority traffic.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for controlling transmission of wireless local area network (WLAN) traffic from a mobile station over a wireless medium, the method comprising:
   monitoring a stream control application in the mobile station to determine whether any WLAN voice stream session is set up and to determine whether any WLAN video stream session is set up;
   responsive to determining from the monitoring of the stream control application that at least one WLAN voice stream session is set up, setting a fragmentation threshold in a WLAN medium access control (MAC) layer of the mobile station to a first value slightly larger than an expected packet size for WLAN voice traffic;
   responsive to determining from the monitoring of the stream control application that no WLAN voice stream sessions are set up and that at least one WLAN video stream session is set up, setting the fragmentation threshold to a second value slightly larger than an expected packet size for WLAN video traffic;
   responsive to determining from the monitoring of the stream control application that no WLAN voice stream sessions are set up and that no WLAN video stream sessions are set up, setting the fragmentation threshold to a third value that is larger than the first value and larger than the second value; and
   fragmenting packets received by the WLAN MAC layer that are larger than the fragmentation threshold into packets each of which is no larger than the fragmentation threshold, wherein the packets received by the WLAN MAC layer include best effort packets or background packets or both.

2. The method of claim 1, wherein determining from the monitoring of the stream control application that at least one WLAN voice stream session is set up comprises:
   identifying that an admission control request for WLAN voice traffic is to be transmitted by the mobile station over the wireless medium to an access point.

3. The method of claim 1, wherein determining from the monitoring of the stream control application that at least one WLAN video stream session is set up comprises:
   identifying that an admission control request for WLAN video traffic is to be transmitted by the mobile station over the wireless medium to an access point.

4. The method of claim 1, wherein determining from the monitoring of the stream control application that no WLAN voice stream sessions are set up comprises:
   identifying that a traffic specification for WLAN voice traffic has either expired or been explicitly terminated by an access point.

5. The method of claim 1, wherein determining from the monitoring of the stream control application that no WLAN video stream sessions are set up comprises:
   identifying that a traffic specification for WLAN video traffic has either expired or been explicitly terminated by an access point.

6. The method of claim 1, further comprising:
   extracting the expected packet size for WLAN voice traffic from a traffic specification in an admission control request for WLAN voice traffic that is to be transmitted by the mobile station over the wireless medium to an access point.

7. The method of claim 1, further comprising:
extracting the expected packet size for WLAN video traffic from a traffic specification in an admission control request for WLAN video traffic that is to be transmitted by the mobile station over the wireless medium to an access point.

8. A method for controlling transmission of wireless local area network (WLAN) traffic from a mobile station over a wireless medium, the method comprising:
dynamically adjusting a fragmentation threshold of a WLAN medium access control (MAC) layer of the mobile station; and
fragmenting packets received by the WLAN MAC layer that are larger than the fragmentation threshold into packets each of which is no larger than the fragmentation threshold, wherein the packets received by the WLAN MAC layer include best effort packets or background packets or both,
wherein dynamically adjusting the fragmentation threshold comprises:
while a single streaming application on the mobile station is receiving data packets over the wireless medium or generating data packets to be transmitted by the mobile station over the wireless medium or both, using for the fragmentation threshold a value that corresponds to a priority assigned by the streaming application to the data packets generated by the single streaming application;
while two or more streaming applications on the mobile station are receiving data packets over the wireless medium or generating data packets to be transmitted by the mobile station over the wireless medium or both, using for the fragmentation threshold a value that corresponds to whichever of the priorities assigned by the two or more streaming applications to the data packets generated by the two or more streaming applications is highest; and
while no streaming application on the mobile station is receiving data packets over the wireless medium or generating data packets to be transmitted by the mobile station over the wireless medium, using for the fragmentation threshold a value that is very large in comparison to the size of the data packets generating by any of the streaming applications on the mobile station.

9. A mobile station comprising:
a wireless local area network (WLAN) interface comprising a medium access control (MAC) layer, through which the mobile station is able to receive and to transmit over a wireless medium, wherein the WLAN MAC layer is operable to fragment packets received thereby that are larger than a fragmentation threshold into packets each of which is no larger than the fragmentation threshold;
a processor coupled to the WLAN interface; and
a memory coupled to the processor, the memory able to store a stream control application and a stream control monitor which, when executed by the processor:
provides the fragmentation threshold to the WLAN MAC layer;
monitors the stream control application to determine whether any WLAN voice stream session is set up and to determine whether any WLAN video stream session is set up;
responsive to determining from the monitoring of the stream control application that at least one WLAN voice stream session is set up, sets the fragmentation threshold to a first value slightly larger than an expected packet size for WLAN voice traffic;
responsive to determining from the monitoring of the stream control application that no WLAN voice stream sessions are set up and that at least one WLAN video stream session is set up, sets the fragmentation threshold to a second value slightly larger than an expected packet size for WLAN video traffic; and
responsive to determining from the monitoring of the stream control application that no WLAN voice stream sessions are set up and that no WLAN video stream sessions are set up, sets the fragmentation threshold to a third value that is larger than the first value and larger than the second value.

10. A mobile station comprising:
a wireless local area network (WLAN) interface comprising a medium access control (MAC) layer, through which the mobile station is able to receive and to transmit over a wireless medium, wherein the WLAN MAC layer is operable to fragment packets received thereby that are larger than a fragmentation threshold into packets each of which is no larger than the fragmentation threshold;
a processor coupled to the WLAN interface; and
a memory coupled to the processor, the memory able to store streaming applications, a stream control application and a stream control monitor which, when executed by the processor, dynamically adjusts the fragmentation threshold and provides the dynamically adjusted fragmentation threshold to the WLAN MAC layer,
wherein dynamically adjusting the fragmentation threshold comprises:
while a single streaming application on the mobile station is receiving data packets over the wireless medium or generating data packets to be transmitted by the mobile station over the wireless medium or both, using for the fragmentation threshold a value that corresponds to a priority assigned by the streaming application to the data packets generated by the single streaming application;
while two or more streaming applications on the mobile station are receiving data packets over the wireless medium or generating data packets to be transmitted by the mobile station over the wireless medium or both, using for the fragmentation threshold a value that corresponds to whichever of the priorities assigned by the two or more streaming applications to the data packets generated by the two or more streaming applications is highest; and
while no streaming application on the mobile station is receiving data packets over the wireless medium or generating data packets to be transmitted by the mobile station over the wireless medium, using for the fragmentation threshold a value that is very large in comparison to the size of the data packets generating by any of the streaming applications on the mobile station.

11. A non-transitory computer-readable medium having stored thereon instructions which, when executed by a processor of a mobile station, result in:
monitoring a stream control application in the mobile station to determine whether any wireless local area network (WLAN) voice stream session is set up and to determine whether any WLAN video stream session is set up;
responsive to determining from the monitoring of the stream control application that at least one WLAN voice stream session is set up, setting a fragmentation threshold in a WLAN medium access control (MAC) layer of the mobile station to a first value slightly larger than an expected packet size for WLAN voice traffic;

responsive to determining from the monitoring of the stream control application that no WLAN voice stream sessions are set up and that at least one WLAN video stream session is set up, setting the fragmentation threshold to a second value slightly larger than an expected packet size for WLAN video traffic;

responsive to determining from the monitoring of the stream control application that no WLAN voice stream sessions are set up and that no WLAN video stream sessions are set up, setting the fragmentation threshold to a third value that is larger than the first value and larger than the second value; and fragmenting packets received by the WLAN MAC layer that are larger than the fragmentation threshold into packets each of which is no larger than the fragmentation threshold, wherein the packets received by the WLAN MAC layer include best effort packets or background packets or both.

12. A non-transitory computer-readable medium having stored thereon instructions which, when executed by a processor of a mobile station, result in:

dynamically adjusting a fragmentation threshold of a WLAN medium access control (MAC) layer of the mobile station; and fragmenting packets received by the WLAN MAC layer that are larger than the fragmentation threshold into packets each of which is no larger than the fragmentation threshold, wherein the packets received by the WLAN MAC layer include best effort packets or background packets or both, wherein dynamically adjusting the fragmentation threshold comprises:

while a single streaming application on the mobile station is receiving data packets over the wireless medium or generating data packets to be transmitted by the mobile station over the wireless medium or both, using for the fragmentation threshold a value that corresponds to a priority assigned by the streaming application to the data packets generated by the single streaming application;

while two or more streaming applications on the mobile station are receiving data packets over the wireless medium or generating data packets to be transmitted by the mobile station over the wireless medium or both, using for the fragmentation threshold a value that corresponds to whichever of the priorities assigned by the two or more streaming applications to the data packets generated by the two or more streaming applications is highest; and while no streaming application on the mobile station is receiving data packets over the wireless medium or generating data packets to be transmitted by the mobile station over the wireless medium, using for the fragmentation threshold a value that is very large in comparison to the size of the data packets generating by any of the streaming applications on the mobile station.

* * * * *